United States Patent [19]

Wahlstrom

[11] 4,054,826
[45] Oct. 18, 1977

[54] METHOD AND APPARATUS FOR CHARGING BATTERIES USING VARIABLE CAPACITORS

[76] Inventor: Sven E. Wahlstrom, 570 Jackson Drive, Palo Alto, Calif. 94303

[21] Appl. No.: 637,536

[22] Filed: Dec. 4, 1975

Related U.S. Application Data

[63] Continuation-in-part of Ser. No. 556,578, March 10, 1975, abandoned.

[51] Int. Cl.² .................... H02J 7/00; H02N 1/00
[52] U.S. Cl. .................... 320/61; 310/308; 320/1; 322/2 A
[58] Field of Search .......... 320/2, 61, 1; 310/4, 310/6, 5; 322/2, 2 A; 58/23 BA

[56] References Cited

U.S. PATENT DOCUMENTS

| | | | |
|---|---|---|---|
| 3,005,305 | 10/1961 | Thoma | 58/23 BA |
| 3,013,201 | 12/1961 | Goldie | 322/2 A |
| 3,094,653 | 6/1963 | LeMay et al. | 322/2 A |

*Primary Examiner*—Robert J. Hickey
*Attorney, Agent, or Firm*—Flehr, Hohbach, Test, Albritton & Herbert

[57] ABSTRACT

Method and apparatus for charging a battery or other electrical energy storage means by converting random mechanical motion into electrical energy by utilizing gravitational and acceleration forces. The apparatus includes two variable capacitors and a bias supply connected to the battery or electrical energy storage means. The variable capacitors have their capacitance varied in an alternating manner by the physical displacement of a conductive member that forms one plate in each of the capacitors. The moving conductive member causes the electrical charge on the capacitors to be passed back and forth. The apparatus further includes a plurality of diodes located in the circuit so that each time the electrical charge passes between the capacitors the current formed thereby passes through the battery and charges it.

23 Claims, 12 Drawing Figures

METHOD AND APPARATUS FOR CHARGING BATTERIES USING VARIABLE CAPACITORS

CROSS REFERENCE TO RELATED APPLICATION

This application is a continuation-in-part of earlier filed copending application, Ser. No. 556,578, filed Mar. 10, 1975 now abandoned.

BACKGROUND OF THE INVENTION

1. Field of the Invention

This invention generally relates to electrical charging systems and, more particularly, to systems for generating the electrical power required to charge storage batteries.

2. Description of the Prior Art

In the past the need for replacing storage batteries has presented problems in convenience, planning and cost. These problems were especially important for the batteries used in portable electronic and electrical equipment. For example, the batteries used in electric watches, portable radios, and hearing aids heretofore required frequent replacement. This replacement often was annoying to the owner because of the length of time the equipment was out of service and the high replacement cost of the batteries.

In the watch industry there has been a continuing search for a power source that can make electronic watches as maintenance free as self-winding watches. The industry has been looking for a system that will permit electronic watches to operate indefinitely.

Recently, there has developed a particular problem in the electronic watch industry. Digital watches have become fashionable and some are equipped with light emitting diodes. These diodes draw more current than conventional electronic watch circuits and often the batteries in these watches require replacement every three or four months. At the present time none of the electronic watch circuits are equipped with battery charging systems, and the watch batteries must be replaced each time the battery is discharged.

The present invention incorporates the well known physical principle that electrical energy can be generated from mechanical motion by mechanically alternating the capacitances of a plurality of capacitors. This principle, however, has never been successfully applied to battery charging systems because the output from these previous systems was too unsymmetrical. Although current was generated in these older systems, the systems could not be adapted to efficiently generate useable AC power.

SUMMARY OF THE INVENTION

The present invention is directed to a method and apparatus for charging a battery or other energy storage means by converting random mechanical motion into electrical energy. The apparatus includes two variable capacitors and a bias supply connected to the battery or other electrical energy storage means. The mechanical motion is used to inversely alternate the capacitance of the two capacitors. The inversely alternating capacitance causes the electric charge on the capacitors to transfer back and forth. The apparatus further includes circuit means for directing the transferring electric charge through the battery or other electrical energy storage means, charging it thereby.

It is an object of the present invention to provide a novel method and apparatus that overcomes the limitations and disadvantages of the prior art.

A further object of the present invention is to convert random mechanical motion into electrical energy by utilizing gravitational and acceleration forces.

An additional object of the present invention is to develop an electrical energy generator for use in applications where space is at a minimum. This objective includes developing a circuit that operates in the simplest possible manner, uses a minimum number of components and contains the simplest possible circuit. One application of the present invention is for charging electronic watch batteries where space and weight are both limited.

A feature of the present invention is that the threshold voltage at which battery charging is commenced is easily reached for any small, relative change in the values of capacitance of the power generating capacitors. In addition, although the cycle of voltage oscillation and the amount of electrical charge transferred between the capacitors are both dependent on the amount of mechanical motion, these two quantities are completely independent of the rate at which the mechanical motion occurs. Although a slow rate of mechanical motion generates a lower charging current, battery recharging in the present invention never ceases as long as capacitor modulation exceeds a predetermined minimum value.

It is contemplated that the embodiments described in this specification include all battery powered equipment subjected to mechanical motion. This type of equipment includes electronic wrist watches, portable radios, hearing aids, cardiac pacemakers, small portable calculators, navigational buoys, and other waterborne equipment, and vehicular mounted electronic equipment.

Additional objects and features of the invention will appear from the following description in which the preferred embodiments have been set forth in detail in conjunction with the accompanying drawings.

DESCRIPTION OF THE PREFERRED EMBODIMENT

Figure 1:
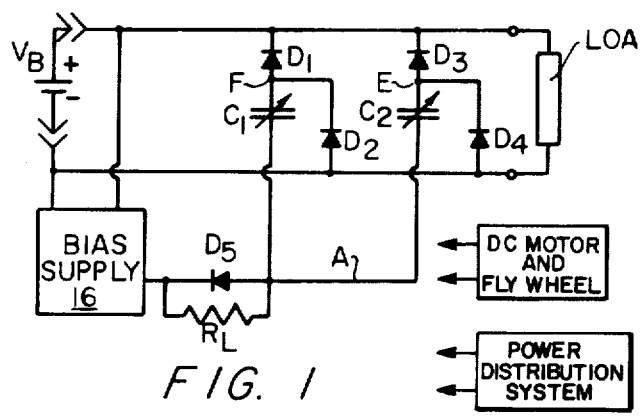
FIG. 1 is a schematic diagram of the basic circuit of the present invention.

FIG. 1 is a schematic diagram of the basic circuit of the present invention. Reference numeral 16 indicates a bias supply that generates a high negative voltage that is supplied to the common terminal point A. In the preferred embodiment the bias supply is a conventional DC/DC converter. This converter can be a conventional blocking oscillator with a third winding used to generate the necessary high bias voltage In one embodiment actually constructed the bias supply applied approximately minus five hundred volts to point A.

The bias supply 16 is connected to a rechargeable battery indicated by the reference letters $V_B$. The rechargeable battery has a operating voltage, depending on its construction, of approximately 1.3 to 1.7 volts. Although any suitable rechargeable battery can be used, a nickel cadmium battery is preferred for electronic watch circuits. The rechargeable battery is connected in series to a load representing the operating mechanism of the watch.

Connected across the battery $V_B$ in parallel with the load are two diodes D1 and D2. The cathode of diode D1 is connected to the positive side of the battery, and the cathode of diode D2 is connected to the anode of diode D1. The anode of diode D2 is connected to the negative side of the battery. Also connected across the battery and in parallel with both the load and the diodes, D1 and D2, are two other diodes, D3 and D4. The cathode of diode D3 is connected to the positive side of the battery, and the cathode of diode D4 is connected to the anode of diode D3. The anode of diode D4 is connected to the negative side of the battery. The diodes were selected to have low leakage in order to increase the efficiency of the circuit. As hereinafter described, any leakage through these diodes does not reduce the electric charge in the circuit but merely makes the charging system less efficient.

The bias supply 16 and the common terminal point A are connected together by the diode D5. Diode D5 is actually the rectifying element for the high voltage output of the DC/DC converter. The cathode of diode D5 is connected to the bias supply and the anode is connected to point A. Diode D5 should be selected to have minimum leakage because any current through diode D5 is seen by the battery $V_B$ as a load in the system. In one embodiment actually constructed, a diode having a leakage of one nanoamp at 1,000 volts was found to be satisfactory. Further, the small leakage across the capacitors C1 and C2, hereinafter described, and through diode D5 is indicated by a resistor RL having a very high resistance.

Connected between the cathode of diode D2 and the terminal point A is a variable capacitor C1. In addition, connected between the cathode of diode D4 and the terminal point A is a second variable capacitor C2. For the purposes of identification capacitors C1 and C2 will hereafter be identified as the power generating capacitors. Capacitors C1 and C2 are mechanically connected together so that the capacitance of each varies in an alternating manner. In all of the embodiments described herein, either random or cyclic mechanical motion is utilized to vary the capacitance of C1 and C2. In the preferred embodiment these two capacitors inversely alternate in capacitance. That is to say, when the capacitance of C1 is at a maximum, the capacitance of C2 is at a minimum, and when the capacitance of C2 is at a maximum, the capacitance of C1 is at a minimum. In one embodiment actually constructed the capacitance of C1 and C2 was approximately 1,000 picofarads.

In order to describe the operation of the circuit illustrated in FIG. 1, assume as initial conditions that the bias supply 16 places a voltage of $-500$ volts on point A. The voltage across the battery $V_B$ is approximately 1.7 volts. The capacitance of capacitor C1 is at its maximum value and the capacitance of capacitor C2 is nearly zero. The electrical charge Q on the capacitor C1 is given according to the following equation $Q_1 = C_1V$, and the energy stored therein is given by the following equation $E_1 = C_1V^2$.

The energy stored in the capacitors C1 and C2 is transferred by utilizing mechanical motion, as hereinafter described, to inversely alternate the capacitance of capacitors C1 and C2. When the capacitance of capacitor C1 is decreased and the capacitance of C2 is increased, the voltage at point F (FIG. 1) becomes positive relative to the voltage at point A. In addition, the voltage at point E becomes negative with respect to the voltage at point A. This change in voltage occurs because both capacitors attempt to maintain the quantity of charge on their plates unchanged. Since the capacitance of C1 has decreased, the voltage across C1 must increase in order to maintain the quantity of charge Q1 at a constant value. When the voltage across C1 has increased sufficiently, the diode D1 becomes forward biased and current flows through D1. The current path is through diode D1, into the positive side of the battery $V_B$, and through diode D4 to point E. The common terminal point A has no net current flowing through it after it is initially charged by the bias supply. Simultaneously, the capacitance of capacitor C2 is increasing in value and tends to forward diode D4. Capacitor C2 tends to drive point F more positive and point E more negative. In summary, as the capacitance of capacitor C1 decreases from its maximum value to zero, the electric charge Q on capacitor C1 is actually transferred from point F through the battery $V_B$ to point E and, thus, the battery is charged by this current.

The energy stored in the capacitors C1 and C2 is transferred back in a cycle that is the reverse of the hereinbefore described sequence. As initial conditions assume that the bias supply 16 places a voltage at point A of $-500$ volts and the voltage across the battery is approximately 1.7 volts. The capacitance of capacitor C1 is at a minimum value and the capacitance of capacitor C2 is at a maximum value. Capacitor C2 contains an electronic charge given by the equation $Q_z = C_2V$.

When the mechanical motion, hereinafter described, causes the capacitance of capacitor C2 to decrease, the voltage at point E becomes positive relative to the voltage at point A. Simultaneously, the capacitance of capacitor C1 tends to increase and the voltage at point F tends to go negative. As before both capacitors initially try to maintain the quantity of charge on their plates unchanged. When the voltage across C2 increases sufficiently, diode D3 becomes forward biased. The electric charge flows from point E through diode D3, into the positive side of the battery, and through the diode D2 to point F. The common terminal point A has no net current flowing through it.

It should be noted that in each part of the cycle there is a net current flow through the battery and this flow is always from the positive side to the negative side of the battery. Thus, battery charging current is produced regardless of which direction the values of capacitance are changing.

It should be further noted that the sum of the electric charges on points E and F remains unchanged throughout the cycle of capacitance change. Although there is a net production of energy which charges the battery, there is no loss of electric charge. The energy for charging the battery is generated by a moving body, hereinafter described, that moves against the electrostatic forces caused by the voltage difference between points E and F.

Although the preferred embodiment hereinbefore described and illustrated in FIG. 1 incorporates a battery $V_B$, it should be appreciated that any suitable electrical energy storage device can be substituted for the battery $V_B$. Suitable energy storage devices are those that can store between cycles the electrical energy generated by mechanical motion and then can be discharged into the load. The construction and operation of the remainder of the circuit remains exactly the same. These storage devices include, for example, a large capacitor that is charged up by the current flow and then discharged into the load. The large capacitor replaces the battery $V_B$ and is connected at the same point in the circuit, FIG. 1. In like manner, the battery $V_B$ can also be replaced by a DC motor connected to a fly wheel. The electrical energy generated by the circuit drives the DC motor and attached fly wheel thereby storing the generated electrical energy as kinetic energy. The stored energy can be recovered by a DC or AC generator also connected and driven by the fly wheel.

Another suitable electrical energy storage device that can be substituted for the battery $V_B$, FIG. 1 is a power distribution system. These distribution systems include the domestic power systems operated by public utilities and the private systems operated on ships and in independent commercial installations. When operating, a power distribution system is a short term, energy storage device because of the transmission time through the system between the energy generator and the load. In effect, the energy generator charges up the transmission lines and after a short period of time, the lines discharge into the load. In some cases there can be hundreds of miles of transmission lines between the generator and the load and the transmission time can be quite substantial. In addition, a power distribution system acts as a buffer between the energy generator and the load. In most applications the load varies continuously and correspondingly changes the power demanded from the generator. The distribution system smooths out the fluctuations in power demand. This operation of the distribution system as a buffer between the energy generator and the load is comparable to the operation of the battery $V_B$ described hereinbefore.

To provide sufficient charging current for a power distribution system, a plurality of simultaneously operating energy generators are used and their outputs are connected to a conventional DC to AC converter. For example, a large number of energy generators can be floated on the surface of the ocean and accelerated by the motion of the ocean waves. The generators are disbursed over a wide area so that at any instant in time each energy generator is undergoing a different acceleration force. The energy generators are all connected in common to a DC/AC converter so that a nearly continuous AC output is obtained. This AC output is connected to the power distribution system and the electrical energy is thereby stored and transmitted to the load.

Figure 2:
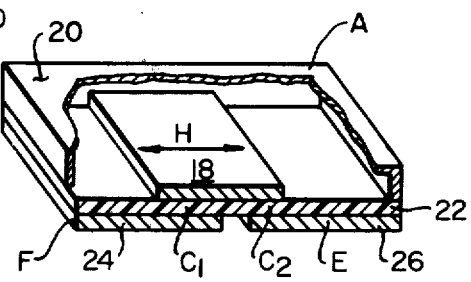
FIG. 2 is a perspective view, partially cut away, of a variable capacitance, electrical energy generator according to the present invention.

FIG. 2 illustrates an apparatus for utilizing mechanical motion to vary the capacitance between two power generating capacitors. Reference numeral 18 indicates a moving body H that is fabricated from an electrically conductive material. The moving body is constrained to slide back and forth in one dimensional motion within a metal frame 20 and to slide on top of a dielectric material 22. Located below the dielectric material are two metal plates 24, 26 that are positioned at the extreme ends of the motion of the moving body. The power generating capacitors C1 and C2 are formed by the dielectric material 22, the moving body 18, and the metal plates 24, 26. The moving body is a capacitor plate common to both capacitors. The circuit illustrated in FIG. 1 is connected to the apparatus at points A, E, and F as indicated in FIG. 2.

The apparatus is operated by subjecting the metal frame 20 and the moving body 18 to either random or cyclic forces. The forces can be acceleration forces that either operate directly on the moving body to cause it to slide back and forth or gravitational forces that generate potential energy that is expended in moving the body. In the embodiment designed for electronic watches, these forces are provided by the random motion of the watch wearer's wrist. At all times the moving body is mechanically free to slide within the frame and is only mechanically constrained by limiting the body to one dimensional motion.

In contrast, after the apparatus is connected to the circuit, the moving body is subjected to an electrostatic force field. This electrostatic force field is caused by the voltage difference between points E and F. When the moving body 18 slides in the metal frame, the moving body makes contact with the frame and is charged up to the bias voltage at point A (FIG. 1). During operation the forces acting on the apparatus cause the moving body to overcome this electrostatic field. When the electrostatic field is overcome, the capacitance on the power generating capacitors is inversely alternated and the battery charging current is generated.

Figure 3:
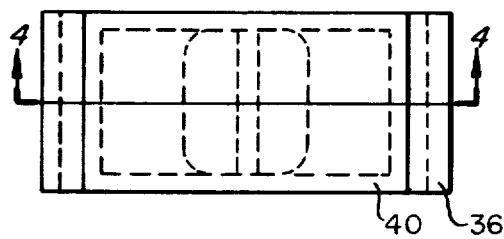
FIG. 3 is a plan view of a first alternative embodiment of the variable capacitance, electrical energy generating system according to the present invention.
Figure 4:
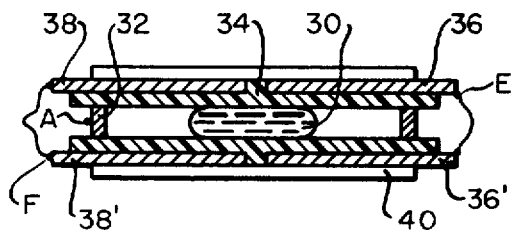
FIG. 4 is a side elevation in section taken along line 4—4 of FIG. 3 of the first alternative embodiment of the variable capacitance, electrical energy generating system.

FIGS. 3 and 4 illustrate an alternative embodiment of the variable capacitance, electrical energy generator. Reference numeral 30 indicates a drop of liquid mercury that acts as the moving body of the system. The mercury flows inside of a thin container so that it continuously contacts the top and bottom walls thereof. The mercury also frequently contacts a metal sidewall 32 that forms the common terminal point A between the two power generating capacitors C1 and C2. When the mercury contacts the metal sidewall, the mercury is charged up to the bias voltage on point A (FIG. 1). Once the mercury is charged, the drop can move within the enclosed space and make only intermittent contact with the sidewall to recharge its potential.

The power generating capacitors are formed by two sheets of dielectric material 34 that separate two sets of two metal plates 36, 36' and 38, 38'. The upper metal plate 36 and the lower metal plate 36' are connected together electrically and, in a like manner, the metal plates 38 and 38' are connected together. When the upper and lower plates are electrically connected together, four capacitors are formed and the capacity for energy storage in the apparatus is doubled. The metal plates, the dielectric, and the sidewall are retained together in one integral unit by a frame 40.

In the preferred embodiment a liquid mercury moving body is preferred for several reasons. Mercury maximizes the conversion of available mechanical work into electrical energy because of its high density. With mercury the moving body performs more work in a limited space with minimum motion. In addition, mercury minimizes the friction between the moving body and the internal surfaces of the assembly. Mercury is also preferred because it has high surface tension. During operation the moving body is subjected to large acceleration forces and a large electrostatic field. The high surface tension of mercury prevents the liquid drop from breaking up into a plurality of small droplets. These small droplets would retain a charge of their own and the capacitor in effect would lose its power generating capability.

Although mercury is described in the preferred embodiment, it should be noted that any conductive liquid may be used for the moving body, includng electrolyte in connection with an electrolytically formed and maintained dielectric. In addition, a battery charging current can be obtained in the same manner as hereinbefore described if a liquid nonconductive dielectric is employed as the moving body and is moved between fixed capacitor plates. Further, the interior volume of the assembly can be filled with an inert gas to prevent a chemical reaction on the moving body. For example, if mercury is used for the moving body, nitrogen gas will reduce the oxidation of mercury. The interior volume can also be filled with a nonconductive liquid such as a petroleum based oil. However, in all these embodiments the difference between the densities of the two fluids should be as large as possible in order to maximize the conversion of mechanical energy.

It should also be noted that to maximize the generation of battery charging current, the stored electrical energy per unit of surface area of each capacitor must be maximized. The stored electrical energy in a capacitor is proportional to $CV^2$, where C is the capacitance of the capacitor and V is the voltage induced across the plates. The capacitance C is proportional to the dielectric constant of the dielectric material and is inversely proportional to its thickness. The voltage V is proportional to the breakdown voltage of the dielectric material. It has been observed that the breakdown voltage for most dielectric materials is proportional to the square root of the thickness of the dielectric. Thus, the electrical energy stored in a capacitor tends to be constant regardless of the thickness of the dielectric material. In the present invention the preferred dielectric material is one which has the highest product of dielectric constant and the square of the breakdown voltage for a given thickness.

A practical means to maximize the generation of battery charging current and the amount of energy stored in the capacitors without operating at too high bias voltages, is to use very thin dielectric materials. In one embodiment actually constructed the dielectric material 22, 34 was fabricated from Mylar. In its thinnest available form, Mylar has a breakdown voltage of approximately 1,000 volts. However, one drawback with Mylar is that it still requires a very high bias voltage in order to maximize energy storage. An additional, perhaps more suitable dielectric material is Parylene obtainable from the Union Carbide Company. A one micron thick layer of Parylene has a breakdown voltage of approximately 500 volts. Thus, Parylene permits the storage of very high energy without requiring a high bias voltage.

Figure 5:
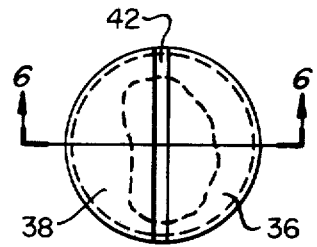
FIG. 5 is a plan view of a second alternative embodiment of the variable capacitance, electrical energy generating system according to the present invention.
Figure 6:
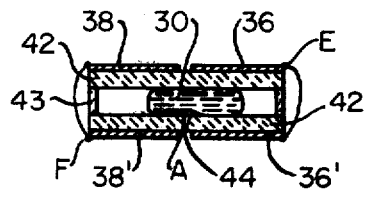
FIG. 6 is a side elevation in section taken along line 6—6 of FIG. 5 of the second alternative embodiment of the variable capacitance, electrical energy generating system.

FIGS. 5 and 6 illustrate another alternative embodiment of the variable capacitance, electrical energy generator. This generator is formed by two circular ceramic discs 42 separated by a cylindrical frame member 43. Attached to the outward facing surface of each disc are two truncated, semicircular conductive plates 36, 36' and 38, 38'. Plates 36, 36' and 38, 38' are electrically connected together. The assembly houses a drop of mercury 30 that continuously contacts a centrally located common electrode 44. This electrode is the common terminal point A (FIG. 1). The power generating capacitor C1 is formed by the drop of mercury, the two ceramic discs 42 and the conductive plates 38, 38'. The capacitor C2 is formed in a likewise manner. The ceramic discs provide a suitable dielectric material because these materials have very high dielectric constants and in spite of low breakdown voltages, they give a high $CV^2$ at low operating voltages. One suitable ceramic dielectric material is barium titanate. The points indicated by letters A, F, and E in FIG. 6 are connected to the corresponding points in the circuit illustrated in FIG. 1.

Figure 7:
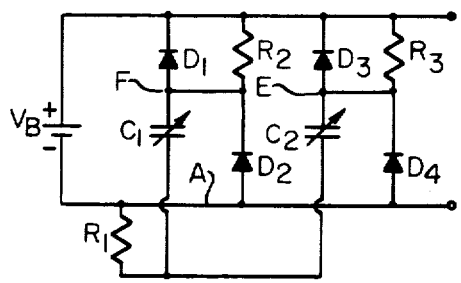
FIG. 7 is a schematic diagram of the circuit of the present invention including a self-biasing circuit.

FIG. 7 illustrates an embodiment of the present invention that incorporates a plurality of biasing resistors for selfbiasing the power generating capacitors C1 and C2. Resistor R1 is connected between the negative side of the battery and the common terminal of the capacitors C1 and C2. Resistor R2 is connected between the positive side of the battery and point F, hereinbefore described. Resistor R3 is connected between the positive side of the battery and point E, also described hereinbefore. Resistor R1, R2 and R3 have very large resistances and in the preferred embodiment each has a resistance of at least 20 megohms. This circuit can be used with any of the variable capacitance, electrical energy generators hereinbefore described.

In operation, these biasing resistors permit the power generating capacitors C1 and C2 to be precharged by the battery to a voltage of $V_B$ during periods when the energy generator is stationary. This circuit is especially usable in battery charging systems where the battery voltage $V_B$ has a high value. For example, some marine and vehicular battery systems operate at voltages of 24 and 28 volts.

Figure 8:
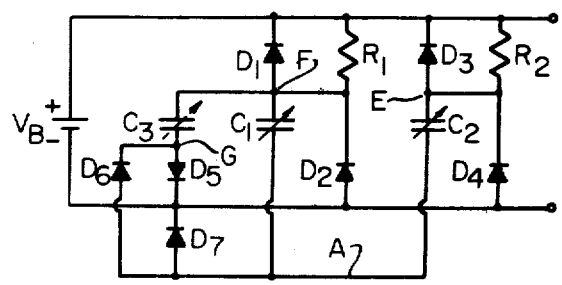
FIG. 8 is a schematic diagram of the circuit of the present invention including a voltage doubling circuit.

FIG. 8 illustrates an embodiment of the present invention wherein a voltage doubling means is included to provide the bias voltage for the power generating capacitors. Capacitor C3 is connected between point F (FIG. 8) and the anode of diode D5. The cathode of D5 is connected to the negative side of the battery. Connected to the anode of D5 is the cathode of diode D6. Diode D6 is also connected to the common terminal, point A, of the capacitors C1 and C2. This terminal is also connected to the negative side of the battery by a diode D7. Diode D7 prevents point A from going positive with respect to the negative side of the battery. In the preferred embodiment capacitor C3 can be either a fixed or a variable capacitor. If capacitor C3 is a fixed capacitor, the circuit approximately doubles the bias voltage applied to the power generating capacitors. If capacitor C3 is a variable capacitor and C3 decreases in capacitance concurrently with the increase of capacitance of C1, then the bias voltage is approximately equal to the battery voltage multiplied by the ratio of the maximum and minimum values of the capacitance of C3.

Figure 9:
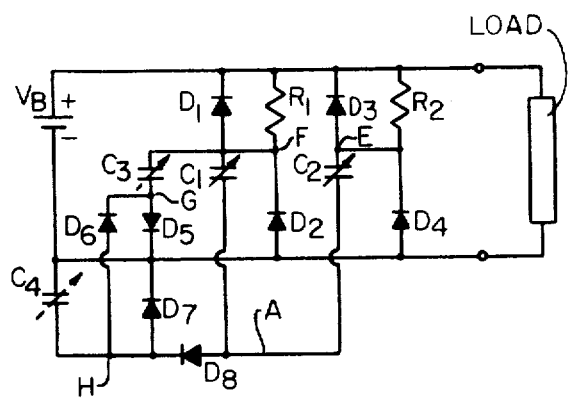
FIG. 9 is a schematic diagram of the circuit of the present invention including two voltage doubling circuits.

FIG. 9 illustrates an embodiment of the present invention having a first voltage doubling means simular to the embodiment of FIG. 8 and second voltage doubling means connected so that the multiplied output of the first voltage doubling means is multiplied by the second voltage doubling means. Capacitor C4 is connected between the negative side of the battery and the anode of diode D6, point H. For purposes of identification, capacitor C3 and C4 will hereinafter be identified as the bias generating capacitors. Diode D8 is connected between the common terminal point A and point H. Diode D8 permits the peak negative voltage applied to point H by capacitor C4 to be also applied to point A. In the preferred embodiment capacitor C4 can be either a fixed or a variable capacitor. If C4 is a large fixed capacitor, then C4 can maintain the bias voltage generated by C3 at a maximum value for long periods of time while the capacitances of capacitors C1, C2 and C3 are not varying. If C4 is a variable capacitor, then the bias voltage can be double multiplied to significantly increase its value. In that case, capacitor C4 is mechanically coupled to capacitor C1 so that both capacitors increase capacitance togehter. Capacitors C2 and C3 are also mechanically coupled together so that they increase capacitance together. In addition, capacitors C1 and C4 vary in capacitance in an inversely alternating manner with respect to capacitors C2 and C3.

Figure 10:
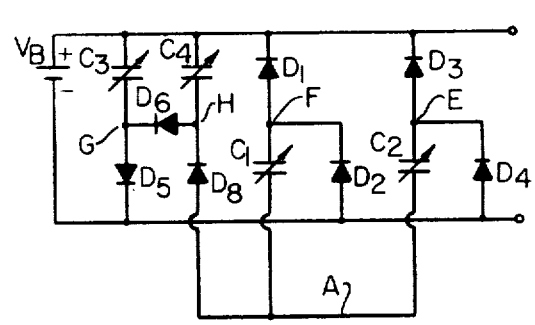
FIG. 10 is a schematic diagram of the circuit of the present invention illustrating an alternative embodiment of the circuit illustrated in FIG. 9.

FIG. 10 illustrates an embodiment of the present invention wherein the bias generating capacitors are both connected at a common terminal to the positive side of the battery. Capacitor C2 inversely varies in capacitance with respect to capacitor C4, and the moving body 18, 30 (FIGS. 2, 4, 6), connected to their common terminal, can be used to vary their capacitance. It should be noted that the two capacitors C3 and C4 in this embodiment can be incorporated into a capacitance varying, electrical energy generator incorporating capacitors C1 and C2. Capacitors C1 and C2 are connected in the manner hereinbefore described. Also, with this embodiment the bias voltage on point A can be increased to a maximum value of approximately $V_B N^2$ where N is the ratio between the maximum and minimum values of capacitance of capacitors C3 and C4.

Figure 11:
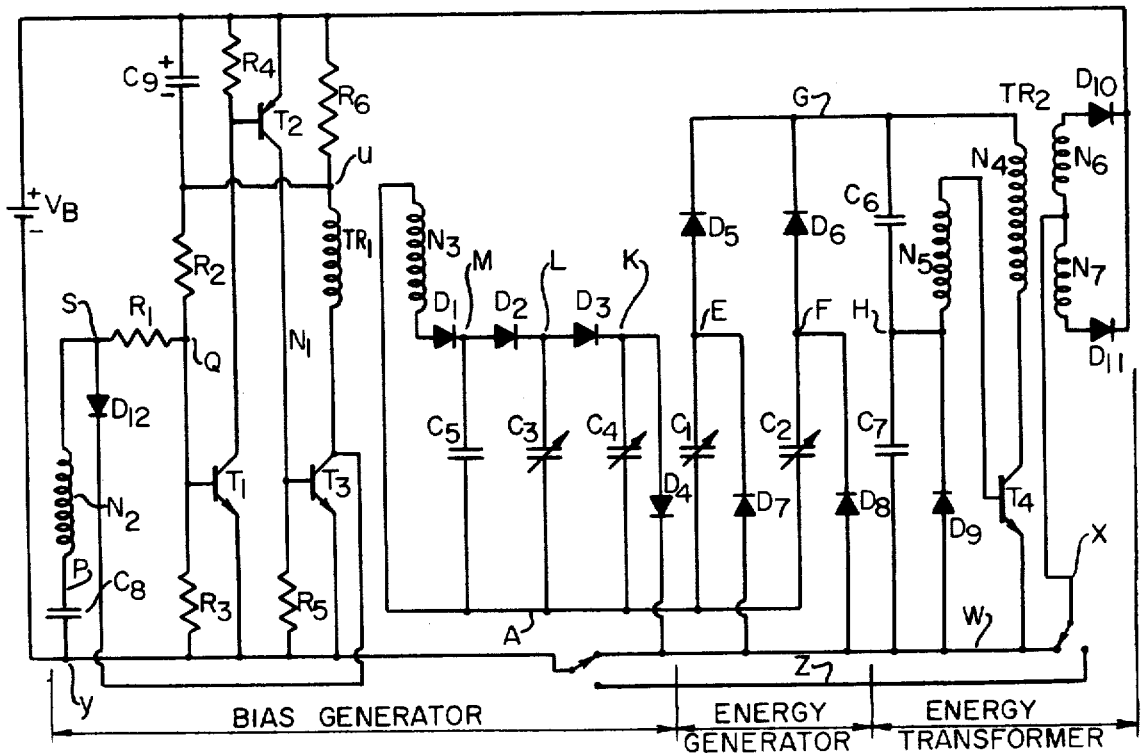
FIG. 11 is a schematic diagram of the circuit of the present invention including a DC/DC converter to generate the bias voltage and a DC/DC converter to transform the generated voltage into battery voltage.

FIG. 11 illustrates an embodiment of the present invention that uses a DC/DC converter to transform the low battery voltage to a higher voltage for biasing the bias generating capacitors. This DC/DC converter includes a blocking oscillator and a pulse transformer. The embodiment also includes a second blocking oscillator and a second pulse transformer for transforming the high voltage output from the power generating capacitors back down to a lower voltage suitable for charging the battery.

The theory, construction, and operation of blocking oscillators and pulse transformers is well known to those having skill in this art. Further information on the subject can be found in "Pulse and Digital Circuits" by Millman and Taub, McGraw-Hill Book Co., Inc. 1956, pp. 253–284.

Referring to FIG. 11, the DC/DC converter includes a blocking oscillator that supplies a high bias voltage across capacitor C5. The blocking oscillator has a very low pulse repetition rate in order to minimize power consumption and a very narrow pulse width in order to minimize the size of the pulse transformer. The use of a blocking oscillator eliminates any direct connection between the capacitors C1–C6 and the battery. Also to minimize battery power consumption, three stages of current amplification in transistors T1, T2 and T3 are used to speed up turn-on. The load current in the turn-on circuit increases nearly coincidentally with turn-on.

The basic elements of the blocking oscillator include resistor R2 in a series with the resistor R1, capacitor C8 in series with winding $N_2$, and transistor T1. Diode D12, forming a Baker clamp, limits the positive voltage on point S and thereby the current to the base of transistor T1 via the current limiting resistor R1. Resistors R2 and R3 are large resistors selected so that the combined resistance of R2, R3 and R6 is such that the voltage drop across resistor R6 is sufficient to bias transistor T1 off. In the embodiment actually constructed the resistance of resistors R2 and R3 was approximately 20 megohms. Resistor R6 and capacitor C9 insure that the blocking oscillator does not remain in a non-oscillating, on state and discharge the battery. Resistor R1 limits the amount of current to the base of transistor T1 when the blocking oscillator is in the on state and has a much smaller resistance than either R2 or R3. In the embodiment actually constructed the bias oscillator has a pulse repetition rate of approximately 1 second and a pulse duration of 5–10 microseconds.

The bias generator also includes a network of serially arranged variable capacitors and diodes connected to the blocking oscillator hereinbefore described. This network generates a high negative bias voltage for the power generating capacitors C1 and C2. The network includes capacitor C5 which has a capacity of approximately one hundred times that of either the bias generating capacitors C3 and C4 or the power generating capacitors C1 and C2. Capacitors C5 collects electric charge over a long period of time and permits a fast buildup of the bias voltage at point A even when the pulse repetition rate of the bias oscillator is very low. Capacitors C3 and C4 are variable capacitors that physically move together and have capacitances that vary uniformly together. The diodes D1, D2 and D3 and the capacitors C3 and C4 form two voltage multiplication networks wherein the multiplied output of one network is multiplied by the succeeding network. These networks are similar to the voltage multiplication networks described in connection with FIG. 9. The cathode of diode D4 is connected to the negative side of the battery so that point A can become more negative with respect to point Y and the negative side of the battery.

The bias generator is connected to an electrical energy generator comprising the power generating capacitors C1 and C2. Capacitors C1 and C2 are mechanically linked together and inversely vary in capacitance. Diodes D7 and D8 correspond in function to diodes D2 and D4 in FIG. 1, and diodes D5 and D6 correspond to diodes D1 and D3 in FIG. 1. As described hereinbefore, point A has a more negative voltage than the negative side of the battery. Points E and F are essentially at the same voltage because of the leakage through capacitors C1 and C2 and because diodes D7 and D8 are forward biased.

The output voltage at point G of the energy generator has a sawtooth shape with the slope of the leading edge of the output wave being a function of the speed of the moving body 18, 30 (FIGS. 2, 4, 6). The number of teeth in the sawtooth wave is proportional to the bias voltage generated at point A divided by the voltage at point G at which the blocking oscillator of the energy transformer hereinafter described starts to conduct.

The energy generator is operated at a very high bias voltage in order to maximize the conversion of mechanical energy to electrical energy. This very high bias voltage generates a large electrostatic field around the power generating capacitors. The large field in turn causes large electrostatic forces to be generated that resist the motion of the moving element. Use of these large forces tends to maximize the conversion of mechanical energy and to promote the efficient operation of the system.

The energy generator is connected to an energy transformer at point G. The energy transformer includes a second blocking oscillator and a second pulse transformer. The energy transformer limits the voltage between points E and F to a maximum value representing the peak voltage of the sawtooth wave and converts the high voltage and low current sawtooth wave output generated by the energy generator into a low voltage, high current output that can be used to charge the battery.

In the energy transformer, capacitors C6 and C7 form a capacitance voltage divider and the capacitance of C6 is much less than that of C7. The secondary winding N6, N7 of the transformer TR2 is center tapped with the center leg connected to the negative side of the battery. The two ends of the secondary winding are connected to diodes D10 and D11 which are in turn connected to the positive side of the battery. The winding N5 is connected to the base of transistor T4 and the winding N4 is connected to the collector of transistor T4. The turns ratio between winding N4 and each secondary winding N6, N7 is approximately 25:1.

In operation, when the moving body 18, 20 moves within the assembly (FIGS. 2, 4, 6), point G goes positive until the capacitance voltage divider formed by capacitors C6 and C7 makes the base of transistor T4 sufficiently positive to initiate blocking oscillation. The turns ration between N4 and the secondary windings N6 and N7 permit a large amount of charge to be transferred to the battery concurrently with discharging point G. Simultaneously, winding N5 forces point H to go negative and the negative excursion of point H is stopped by diode D9. The energy transformer oscillates for a large number of cycles for each single complete movement of the moving body 18, 30. The blocking oscillator stays on until the voltage across winding N5 is insufficient to keep the base current through transistor T4 flowing.

It should be noted that the blocking oscillator in the energy transformer need not be connected directly to the battery. The switches indicated between points Y and X and point Z in FIG. 11 illustrate that the blocking oscillator can be connected so that the oscillator floats independently from the battery in the same manner as capacitors C1–C5. The switches also permit the blocking oscillator in the bias generator to be replaced by a battery connected between points M and A. This battery would provide a bias voltage for the capacitors C3 and C4.

It should further be noted that if points Y and X are connected to Z while W is floating and if, in addition, point A is connected to Y, Z and X, the same battery as is charged by diodes D10 and D11 can provide the initial low voltage bias between points M and A. The bias generating capacitors C3 and C4 will in this case, during repetitive motions, build up a positive bias voltage between points E, F and A via diodes D4, D7 and D8.

It should also be noted that in the embodiment illustrated in FIG. 11 the bias generating capacitors C3 and C4 share a common terminal, point A, with the power generating capacitors C1 and C2. This embodiment permits the use of an energy generator having a plurality of capacitors and using only one moving element.

Figure 12:
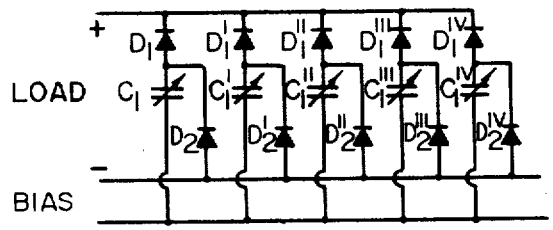
FIG. 12 is a schematic diagram of the circuit of the present invention wherein a plurality of power generating capacitors are interconnected.

FIG. 12 is an embodiment of the present invention wherein a plurality of power generating capacitors $C_1$–$C_1^{IV}$ are interconnected. The capacitors are mechanically independent and each varies in capacitance in an independent manner. The bias voltage is commonly applied and each capacitor is individually connected by a diode $D_1$ to a circuit for receiving its flow of charge. When any of these capacitors are subjected to a force that decreases its respective capacitance, that capacitor delivers a flow of charge through its diode to the load circuit. Since the capacitors are mechanically independent, they can be located to respond to acceleration and gravitational forces from any direction. This embodiment is contrasted with the energy generators illustrated in FIGS. 2–6 that are responsive to substantially only one degree of motion.

It should be appreciated that in all of the circuits described herein and illustrated in FIGS. 1–12 a suitable electrical energy storage device can be substituted for the battery $V_B$. Examples of these devices include large capacitors, DC motor/fly wheel units and power distribution systems. These devices are further described herein in connection with FIG. 1.

Although the best modes contemplated for carrying out the present invention have been herein shown and described, it will be apparent the modification and variation may be made without departing from what is regarded to be the subject matter of the invention.

What is claimed is:

1. Apparatus for generating electrical power for consumption by converting mechanical motion to electrical energy, comprising:
   a. capacitor means for storing electrical energy;
   b. bias supply means for providing an electrical charge on said capacitor means;
   c. a conductive liquid responsive to mechanical motion and cooperating with said capacitor means for changing the capacitance thereof; and
   d. circuit means for transferring electrical energy from said capacitor means to power consumption means in response to changes in the stored electrical energy in said capacitor means as a result of said mechanical motion.

2. The apparatus of claim 1 wherein the conductive liquid is mercury.

3. Apparatus for operating an electrical energy storage means by converting mechanical motion to electrical energy, comprising:
   a. means for storing electrical energy;
   b. first capacitor means for storing electrical charges connected to said energy storage means;
   c. second capacitor means for storing electrical charges connected to both said energy storage means and said first capacitor means;
   d. mechanical means cooperating with said first and second capacitor means for inversely alternating the capacitance therebetween, said mechanical means includes a quantity of conductive liquid movable between said first capacitor means and said second capacitor means; and e. circuit means for transferring electrical charges between said first and second capacitor means and through said energy storage means in response to the alternating capacitance.

4. Apparatus for charging a battery by converting mechanical motion to electrical energy, comprising:
   a. a rechargeable battery;
   b. first capacitor means for storing electrical charges connected to said battery;
   c. second capacitor means for storing electrical charges connected to both said battery and said first capacitor means;
   d. mechanical means cooperating with said first and second capacitor means for alternating the capacitance therebetween, said mechanical means includes a quantity of conductive liquid movable between said first capacitor means and said second capacitor means; and
   e. circuit means for transferring electrical charges between said first and second capacitor means and through said battery in response to the alternating capacitance so that the battery is charged by the transfer of said charges.

5. Method for charging a battery by converting mechanical motion to electrical energy, comprising the steps of:
   a. providing circuit means for transferring charge between first and second variable capacitor means and the battery;
   b. precharging the first and second variable capacitor means with a fixed quantity of charge;
   c. generating an electrostatic force field in the first capacitor means;
   d. moving a body against the electrostatic force field in the first capacitor means by accelerating the body by subjecting it to exterior physical forces so that said charge is transferred from the first capacitor means to the second capacitor means through said battery, charging said battery thereby, said body being a quantity of liquid mercury movable within the cavity;
   e. generating an electrostatic force field in the second capacitor means; and
   f. moving the body against the electrostatic force field in the second capacitor means by accelerating the body by subjecting it to exterior physical forces so that said charge is transferred from the second capacitor means back to the first capacitor means through said battery, charging said battery thereby, said body being a quantity of liquid mercury movable within the cavity.

6. Apparatus for charging a battery by converting mechanical motion to electrical energy, comprising:
   a. a battery rechargeable by passing a charging current therethrough;
   b. first and second diode means connected across said battery;
   c. third and fourth diode means connected across said battery, said first and second diode means being connected in parallel with said third and fourth diode means and all said beforementioned diode means being forward biased with respect to the charging current;
   d. bias supply means connected to said battery;
   e. first variable capacitor means connected between the first and second diode means and the bias supply means;
   f. second variable capacitor means connected between the third and fourth diode means and the bias supply means, said bias supply means placing a fixed quantity of charge on said first and second variable capacitor means; and
   g. mechanical means cooperating with said first and second capacitor means for inversely alternating the capacitance therebetween so that the fixed quantity of charge transfers between the first and second capacitor means in response thereto and generates the charging current through the battery.

7. The apparatus of claim 6 wherein the bias supply means includes a DC to DC converter powered by said battery.

8. The apparatus of claim 6 wherein the bias supply means includes resistor means connected to the battery for self-biasing said first and second variable capacitor means.

9. The apparatus of claim 6 wherein the bias supply means includes voltage doubling means connected to said first and second capacitor means.

10. The apparatus of claim 9 wherein the voltage doubling means includes third variable capacitor means connected to said first capacitor means, said third variable capacitor means inversely varies in capacitance with respect to said first variable capacitor means.

11. The apparatus of claim 6 wherein the bias supply means includes first voltage doubling means connected to said first and second capacitors and second voltage doubling means connected to said first and second capacitors, said first and second voltage doubling means being connected so that the multiplied output of the first voltage doubling means is multiplied by the second voltage doubling means.

12. The apparatus of claim 6 wherein the bias supply means includes third and fourth variable capacitor means each connected to the battery, said third and fourth capacitor means share a common electrical terminal.

13. The apparatus of claim 12 wherein the third variable capacitor means varies in capacitance inversely with respect to the fourth variable capacitor means.

14. The apparatus of claim 6 wherein the bias supply means includes blocking oscillator means and pulse transformer means connected to the battery and powered thereby, said bias oscillator means and pulse transformer means providing the bias voltage to said first and second variable capacitor means.

15. The apparatus of claim 14 wherein said blocking oscillator means includes amplifying means for increasing the bias voltage output of the bias supply means.

16. The apparatus of claim 6 further including blocking oscillator means and pulse transformer means to the output of the first and second variable capacitor means so that the first and second capacitor means operate at a substantially higher voltage than the voltage of the battery.

17. Apparatus for operating an electrical energy storage means by converting mechanical motion to electrical energy, comprising:
   a. means for storing electrical energy by passing a charging current therethrough;
   b. first and second diode means connected across said energy storage means;

c. third and fourth diode means connected across said energy storage means, said first and second diode means being connected in parallel with said third and fourth diode means and all said beforementioned diode means being forward biased with respect to the charging current;

d. bias supply means connected to said energy storage means;

e. first variable capacitor means connected between the first and second diode means and the bias supply means;

f. second variable capacitor means connected between the third and fourth diode means and the bias supply means, said bias supply means placing a fixed quantity of charge on said first and second variable capacitor means; and g. mechanical means cooperating with said first and second capacitor means for inversely alternating the capacitance therebetween so that the fixed quantity of charge transfers between the first and second capacitor means in response thereto and generates the charging current through the energy storage means.

18. The apparatus of claim 17 wherein the bias supply means includes a DC to DC converter powered by said energy storage means.

19. The apparatus of claim 17 wherein the bias supply means includes resistor means connected to the energy storage means for self-biasing said first and second variable capacitor means.

20. The apparatus of claim 17 wherein the bias supply means includes voltage doubling means connected to said first and second capacitor means.

21. The apparatus of claim 17 wherein the electrical energy storage means includes a capacitor that can be charged up by said charging current and can be discharged into a load.

22. The apparatus of claim 17 wherein the electrical energy storage means includes a fly wheel rotated by a DC motor that is powered by said charging current.

23. The apparatus of claim 17 wherein the electrical energy storage means includes a power distribution system.

* * * * *